United States Patent
Kao et al.

(10) Patent No.: US 12,096,099 B2
(45) Date of Patent: Sep. 17, 2024

(54) APPARATUS AND METHOD TO ENABLE A MULTI SPECTRUM CAMERA WITH A SINGLE LENS ASSEMBLY

(71) Applicant: Dell Products L.P., Round Rock, TX (US)

(72) Inventors: Chih-Hao Kao, Singapore (SG); Ghee Beng Ooi, Singapore (SG)

(73) Assignee: Dell Products L.P., Round Rock, TX (US)

( * ) Notice: Subject to any disclaimer, the term of this patent is extended or adjusted under 35 U.S.C. 154(b) by 112 days.

(21) Appl. No.: 17/557,286

(22) Filed: Dec. 21, 2021

(65) Prior Publication Data

US 2023/0199279 A1   Jun. 22, 2023

(51) Int. Cl.
*H04N 23/11* (2023.01)
*G02B 27/10* (2006.01)
*H04N 23/55* (2023.01)

(52) U.S. Cl.
CPC ......... *H04N 23/11* (2023.01); *G02B 27/1013* (2013.01); *H04N 23/55* (2023.01)

(58) Field of Classification Search
CPC ..... G02B 27/1013; H04N 23/55; H04N 23/11
See application file for complete search history.

(56) References Cited

U.S. PATENT DOCUMENTS

| | | | |
|---|---|---|---|
| 4,237,492 A | 12/1980 | Roth et al. | |
| 7,933,507 B2 | 4/2011 | Jelenek et al. | |
| 11,041,718 B2 | 6/2021 | Send et al. | |
| 2008/0174691 A1 | 7/2008 | Polidor et al. | |
| 2017/0205230 A1* | 7/2017 | Send | G01S 7/481 |

* cited by examiner

*Primary Examiner* — On S Mung
(74) *Attorney, Agent, or Firm* — ZAGORIN CAVE LLP; Robert W. Holland

(57) ABSTRACT

A camera captures visual and infrared images through a single lens assembly by inserting a beam splitter along the path of light proceeding through the lens assembly to pass a first light spectrum to a first image sensor along the lens axis and reflect a second light spectrum to a second image sensor along a reflection axis. For example, a hot mirror reflects infrared light along the reflection axis and passes through visible light along the lens axis, and a cold mirror reflects visible light along the reflection axis and passes infrared light through along the lens axis. Processing of an infrared image to define boundaries of a visible image provides a high quality composite image.

20 Claims, 3 Drawing Sheets

APPARATUS AND METHOD TO ENABLE A MULTI SPECTRUM CAMERA WITH A SINGLE LENS ASSEMBLY

BACKGROUND OF THE INVENTION

Field of the Invention

The present invention relates in general to the field of portable information handling system cameras, and more particularly to an information handling system multi-spectrum camera sharing a common lens assembly.

Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Information handling systems have become communication tools for the modern remote office. In addition to network communication of emails, texts and documents, information handling systems often interface with a camera to support video conferencing. Cameras are commonly integrated in portable information handling systems, such as in a lid of a convertible system or the rear side of a tablet system. In addition, peripheral cameras are often interfaced with desktop and portable information handling systems. Peripheral cameras typically have larger camera housings that can include a higher quality lens assembly when compared to the housing size available in a portable information handling system housing. Generally, a peripheral camera will couple to a peripheral display or be supported on a stand so that the peripheral camera is aligned to capture an image of the end user when the end user is looking at the display. One advantage of a peripheral camera over an integrated camera is that greater housing space provides room for a higher quality lens that offers improved image capture and optical zoom. In addition, peripheral cameras can move relative to a display for different viewing angles, and/or pan/tilt for different field of views. Often, in order to secure against the unauthorized capture of visual images by a malicious actor, integrated and peripheral cameras have a shutter that opens to expose the lens assembly to external light and close to block the lens assembly from external light.

In addition to capturing images in the visible light spectrum using Red/Green/Blue (RGB) image sensors, information handling system cameras also often include a separate infrared camera that captures images with an infrared sensor. Infrared images offer a number of functional advantages. For instance, a user presence detection system typically illuminates an infrared light source at the front of a camera and then measures a time of flight for the infrared light to reflect against a target in order to determine a distance to the target. Periodic scanning with infrared illumination detects changes in distance to a target that the camera deduces to be movement that indicates user presence. Similarly, a lack of movement over a defined time period indicates user absence, which allows for security steps, such as turning off the system display to protect against unauthorized viewing. Generally, infrared functions are supported with a separate infrared camera assembly. In a portable information handling system housing, the infrared camera is typically placed next to the visual spectrum camera. In a peripheral camera, the infrared camera is typically a separate assembly integrated in the front housing of the camera along with an infrared illumination source. Typically, a shutter that closes the camera for security covers both the visual lens assembly and the separate infrared lens assembly, which can increase the size of the shutter at the camera front face.

One of the factors that improves the visual images captured by peripheral cameras is the availability of advanced lens and filter techniques. For example, digital single-lens reflex (DSLR) cameras use a mirror to alternate sending the visual image to a view finder or to a digital RGB sensor that captures the visual image. DSLR cameras often have separate lens assemblies that can be changed out to alter the images taken by the image sensor. Adjustments to the camera aperture provide more direct control of light that passes to the image sensor. In addition, filters may be included at the front of the lens or along the path to the image sensor to isolate the visual spectrum of interest. For instance, a hot mirror is often employed to reflect away infrared light that can damage optical equipment. A cold mirror reflects visible light and passes through infrared light with the mirror having an angle of incidence to reflect visible light at a desired image sensor.

SUMMARY OF THE INVENTION

Therefore, a need has arisen for a system and method which captures multiple images through a common lens assembly for use at an information handling system.

In accordance with the present invention, a system and method are provided which substantially reduce the disadvantages and problems associated with previous methods and systems for capturing images with a camera. A camera housing contains a single lens assembly that directs light from a field of view along a lens axis to a beam splitter that passes a first spectrum of light to a first image sensor and reflects a second spectrum of light to a second image sensor. For example, cold or hot mirrors are a type of beam splitter used to reflect and/or pass visual and infrared spectrum light to RGB and infrared image sensors.

More specifically, an information handling system processes information with processing components disposed in a housing, such as a central processing unit (CPU) that executes instructions to process information and a random access memory (RAM) that stores the instructions and information. A camera interfaces with the information handling system to capture visual images to support information handling system operations, such as video conferencing. The camera includes a single lens assembly in a camera housing that captures images from a field of view that extends out a lens axis. The lens assembly directs light to a first image sensor disposed along the lens axis within the camera housing and through a beam splitter disposed between the first image sensor and the lens assembly. The beam splitter passes light of a first spectrum to the first image sensor to capture an image in the first spectrum and reflects light of a second spectrum to a reflection axis and towards a second image sensor disposed along the reflection axis that captures an image in the second spectrum. When a cold mirror is used as the beam splitter, infrared light passes through the beam splitter to an infrared sensor and visible light reflects from the beam splitter to an RGB sensor. When a hot mirror is used as a beam filter, visible light passes through the beam splitter to an RGB sensor and infrared light reflects from the beam splitter to an infrared sensor. A processing resource, such as an image signal processor selectively combines the captured visual images to provide an enhanced composite image, such as by defining boundaries of a visual light spectrum image with boundaries determined from an infrared spectrum image.

The present invention provides a number of important technical advantages. One example of an important technical advantage is that a camera leverages a single lens assembly to capture images in multiple spectrums, such as visible and infrared spectrums. Supporting infrared and visual image capture through a single lens assembly reduces camera cost and provides a reduced housing size with enhanced resolution of the infrared image and a single lens shutter for camera security. Matching image sensor resolution in the infrared and visible light spectrums provides an image signal processor with accurate image resolution for different ambient light settings with improved depth, accuracy and boundaries. The camera may operate in an infrared-only mode that supports image capture in low light conditions, user presence detection, depth camera operations and other infrared usage models while securing against image capture by an RGB sensor. Adjusting the angle of incidence at which the beam splitter reflects light offers variety in image depth and can provide enhanced three dimensional views.

BRIEF DESCRIPTION OF THE DRAWINGS

The present invention may be better understood, and its numerous objects, features and advantages made apparent to those skilled in the art by referencing the accompanying drawings. The use of the same reference number throughout the several figures designates a like or similar element.

DETAILED DESCRIPTION

A camera captures visual images for an information handling system through a single lens assembly by directing a portion of the spectrum of light provided through the lens assembly with a beam splitter towards a secondary image sensor. For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, and a video display. The information handling system may also include one or more buses operable to transmit communications between the various hardware components.

Figure 1:
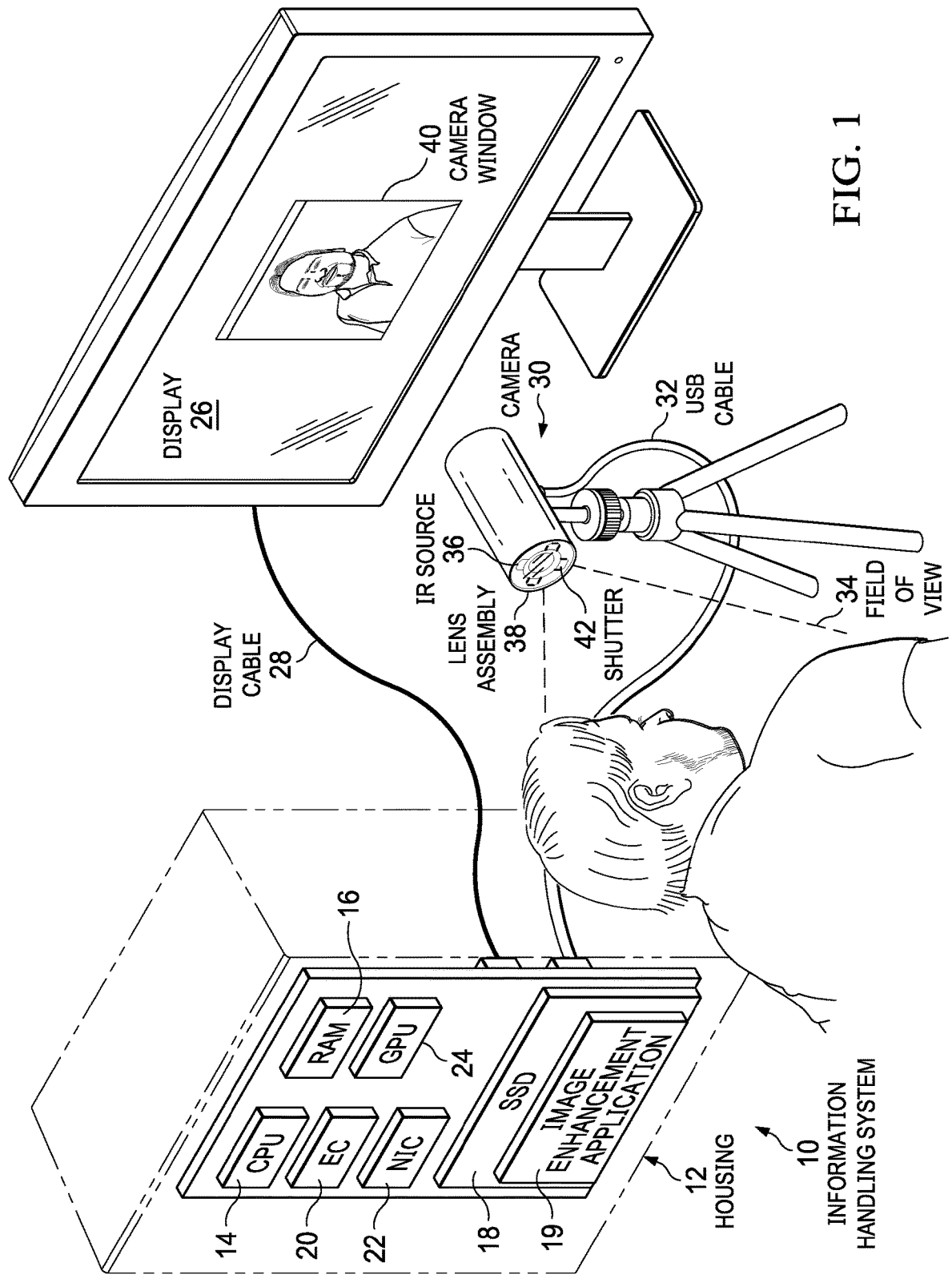
FIG. 1 depicts a block diagram of an information handling system interfaced with a camera having visual and infrared image sensors capturing images through a single lens assembly.

Referring now to FIG. 1, a block diagram depicts an information handling system 10 interfaced with a camera 30 having visual and infrared image sensors capturing images through a single lens assembly. Information handling system 10 process information with processing components disposed in a housing 12, such as a central processing unit (CPU) 14 that executes instructions to process information and a random access memory (RAM) 16 that stores the instructions and information. A solid state drive (SSD) 18 provides persistent storage of information during power down periods, such as an operating system and applications that are recalled at power up to CPU 14 for execution. For instance, in the example embodiment an image enhancement application 19 is retrieved to CPU 14 to execute for processing visual images, as is described in greater depth below. An embedded controller 20 interfaces with CPU 14 to manage physical operations at the information handling system, such as application of power, thermal management and interactions with peripheral devices like a keyboard and mouse. A network interface controller (NIC) 22 supports network communications of information, such as through an Ethernet cable or a wireless local area network. A graphics processing unit (GPU) 24 interfaces with CPU 14 and further processes information to define visual images for presentation at a display 26, such as with pixel values that define pixel colors scanned to display 26 through display cable 28. In the example embodiment, display 26 has a peripheral configuration, however, in alternative embodiments, a portable information handling system may in corporate display 26 in housing 12. In another example embodiment, camera 30 may incorporate into a portable housing.

A camera 30 interfaces with information handling system 10 through a USB cable 32 or wireless signal communications to capture visual images associated with operations of the information handling system. For example, camera 30 includes a lens assembly 38 directed towards a field of view 34 and internal image sensors that capture images in first and second spectrums, such as the visible spectrum using an RGB sensor and the infrared spectrum using an infrared sensor. In the example embodiment, an infrared source 36 provides infrared illumination to improve captured infrared images and support various functions provided by infrared images, such as user presence detection, depth camera images and facial recognition. A shutter 42 selectively opens and closes over lens assembly 38 to allow the capture of visual images and block the capture of visual images, respectively. Since both visual spectrum and infrared spectrum images are captured from a single lens assembly 38, shutter 42 provides security that prevents capture of either type of image when closed. In the example embodiment, shutter 42 is opened to provide access of field of view 34 to lens assembly 38 so that a visual image captured by camera 30 is presented in a camera window 40. In addition to capture and presentation of visual images in a visual spectrum, camera 30 supports a variety of functions that use the infrared spectrum, or that use both visible and infrared spectrums simultaneously. For instance, an image enhancement application 19 stored in SSD 18 may apply boundaries defined by the infrared spectrum to adjust images captured in the visual spectrum, such as colors that fade in the visual spectrum at the boundaries. Image enhancement application 19 may perform other functions based upon changes in the images captured, such as three dimensional depth analysis. Although the example embodiment depicts an image enhancement application that executes on CPU 14, in alternative embodiments some or all of the image enhancement functionality may be performed at other processing resources, such as an image signal processor or other types of digital signal processors.

Figure 2:
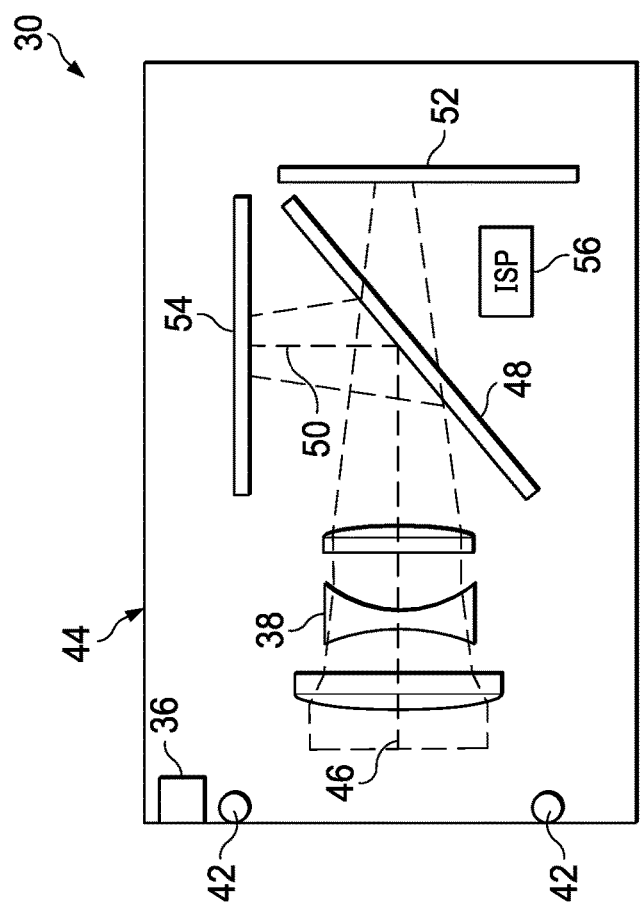
FIG. 2 depicts a side cutaway view of an example camera having a beam splitter that directs different light spectrums to different image sensors.

Referring now to FIG. 2, a side cutaway view depicts an example camera 30 having a beam splitter 48 that directs different light spectrums to different image sensors. The example embodiment holds a single lens assembly 38 in a camera housing 44 so that a lens axis 46 of lens assembly 38 aligns with the field of view captured by camera 30 external to camera housing 44. Lens assembly 38 directs external light captured from the field of view to focus at a first image sensor 52 disposed perpendicular to lens axis 46 at a rear side of camera housing 44. Beam splitter 48 intersects lens axis 46 at approximately a 45 degree angle and has a coating that reflects a predetermined portion of light arriving from lens assembly 38 to a reflection axis 50 directed towards a second image sensor 54. Beam splitter 48 passes through light of the first spectrum towards first image sensor 52 while reflecting away light of a second spectrum towards second image sensor 54. In one embodiment, beam splitter 48 is a "hot mirror" that passes light of the visible spectrum through and towards an RGB sensor as first image sensor 52, and that reflects light of the infrared spectrum upwards and towards an infrared sensor as second image sensor 54. In another embodiment, beam splitter 48 is a "cold mirror" that passes light of the infrared spectrum through and towards an infrared sensor as first image sensor 52, and that reflects light of the visible spectrum upwards and towards an RGB sensor as second image sensor 54. In one embodiment, beam splitter 48 targets an infrared spectrum associated with infrared source 36 illumination. Thus, for example, when infrared functions like facial recognition and user presence are performed, infrared source 36 illuminates and the visual image sensor can remain active or power down. For instance, when performing user presence detection camera 34 may command off the visual image sensor to enhance security while capturing infrared images with the infrared image sensor. Alternatively, both image sensors may operate simultaneously. The light spectrum of beam splitter 48 is determined by dielectric or similar treatments applied to a borosilicate glass or similar substrate. The light spectrums may include visual spectrums of 400 to 700 nm and near infrared spectrums of around 850 nm, such as to capture night images. In another alternative embodiment, ultraviolet or other light spectrums may be filtered.

In one example embodiment, an image signal processor (ISP) 56 included in camera 30 provides real time processing that selectively applies images captured by one or both of image sensors 52 and 54. For instance, ISP 56 may apply boundaries that are well defined in an infrared image to adjust colors presented in a visual image captured by an RGB sensor. RGB sensors sometimes have a blurred image at boundaries between different depths while infrared sensors detect crisp boundaries at the different depths. ISP 56 adjusts colors to better define boundaries that might otherwise appear unclear. Although a typical beam splitter 48 has high reflection rate, such as 97% reflection for a cold mirror, some ambiguity may arise, such as related to refraction of light that passes through the mirror. ISP 56 may provide an automated correction for known inaccuracies related to beam splitter optics. In one example embodiment, both the image sensors 52 and 54 may have identical resolutions or resolutions with a definitive positional relationship so that processing of the images is performed in an efficient manner. In another example embodiment, ISP 56 interfaces with an actuator that changes that angle of incidence of reflections off the beam splitter 48, such as by rotating beam splitter 48 to a more perpendicular alignment relative to lens axis 46. For instance, at a lower angle of incidence reduced refraction results in less distortion of light that passes through beam splitter 48. When beam splitter 48 rotates to a reduced angle of incidence, focus towards the image sensor of the reflection axis may be kept with movement of the image sensor. For instance, changing the angle of incidence can offer different three dimensional views for light that is directed at the image sensor so that ISP 56 can create composite visual images that enhance three dimensional effects.

Figure 3A:
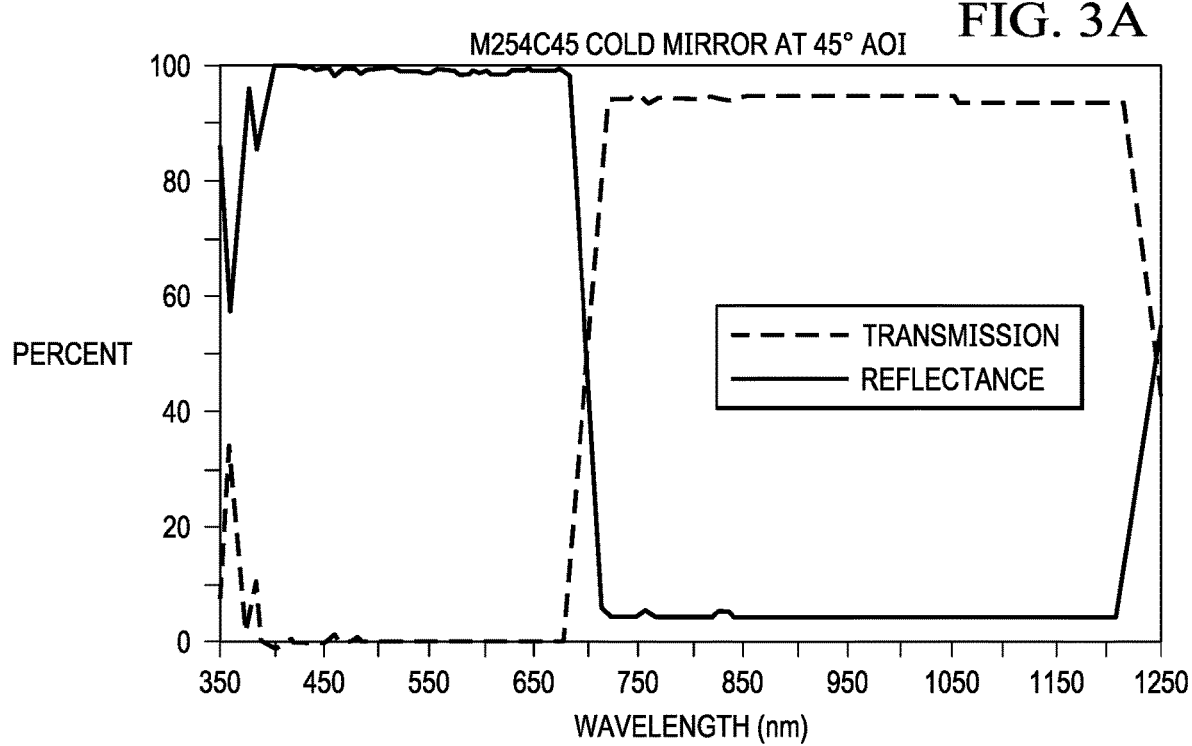
FIGS. 3A and 3B depict an example of light spectrum separation for a beam splitter at different angles of incidence.
Figure 3B:
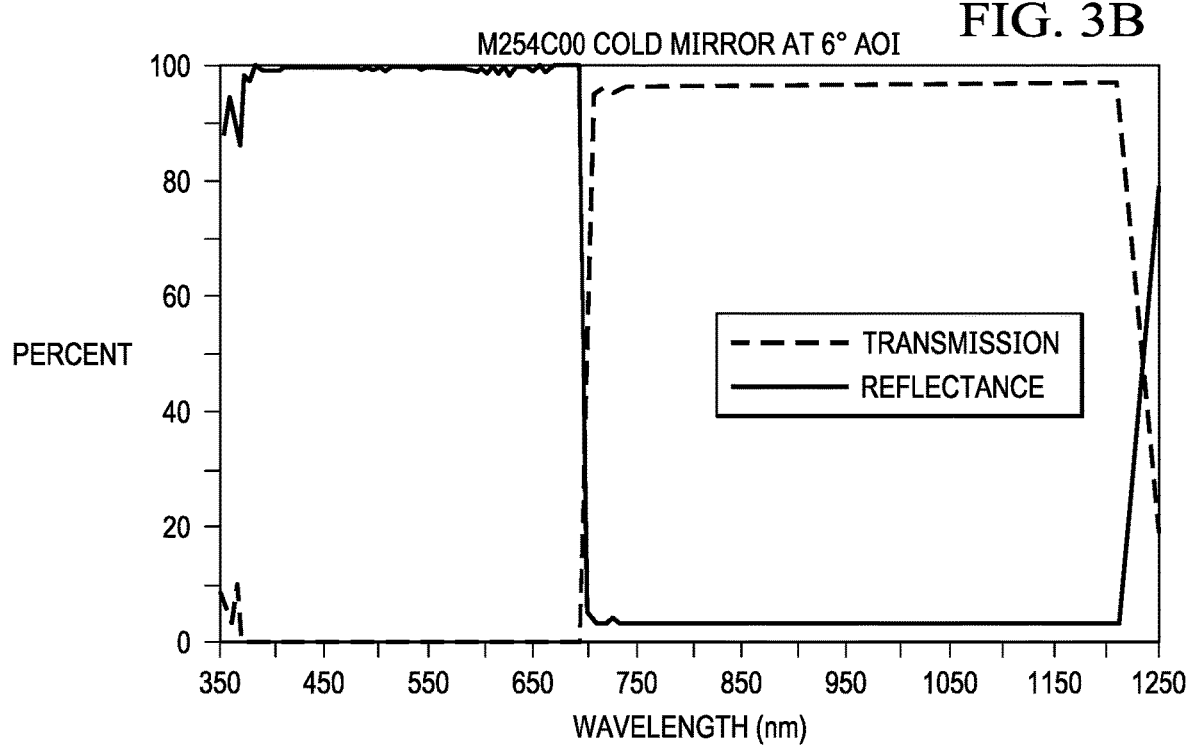

Referring now to FIGS. 3A and 3B, an example depicts light spectrum separation for a beam splitter at different angles of incidence. In the example embodiment, an M2540C cold mirror transmission and reflectance is depicted by FIG. 3A at a 45 degree angle of incidence and by FIG. 3B at a 6 degree angle of incidence. Rotation of the beam splitter allows adjustments of the angle of incidence based upon, for instance, whether one or both image sensors is active. In one embodiment, rotation of the beam splitter 48 directs reflected visual images away from an RGB sensor for improved camera security when an end user is not capturing visual images. In an alterative embodiment, the beam splitter is assembled with a low angle of incidence, such as 10 degrees or less compared to the depicted 45 degrees of the example of FIG. 3, to reflect at an image sensor to manage the filter effectiveness. Although the example embodiment uses a beam splitter to reflect and pass visible and infrared light spectrums, in alternative embodiments a beam splitter may be customized based upon material and coating processes to address other light spectrums, such as splitting ultraviolet and visual light or additional light frequencies. As an example, multiple beam splitters in alignment may split infrared, visible and ultraviolet light to three different sensors.

Figure 4:
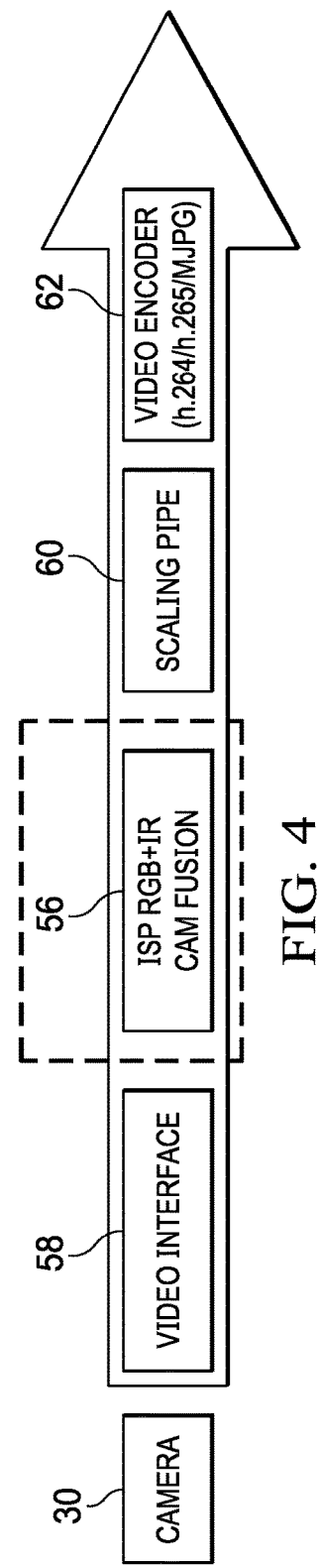
FIG. 4 depicts a flow diagram of a process for enhancing visual light spectrum captured images with infrared captured images.

Referring now to FIG. 4, a flow diagram depicts a process for enhancing visual light spectrum captured images with infrared captured images. The process starts with capture of visual images at camera 30 in two or more spectrums. The process continues with a video interface 58 that communicates the multiple images to an ISP 56 that combines the visual images for a desired effect, such combining RGB visual spectrum images and infrared spectrum images. By having two identical images, such the same resolution and lens focus, data points from each image provides details in a composite image that is lacking in the separate spectrums. A scaling pipe 60 scales the images to a shared resolution and passes the composite visual image to a video encoder 62 that outputs MP4 or MJPG images that are playable by an information handling system graphics processor.

Although the present invention has been described in detail, it should be understood that various changes, substitutions and alterations can be made hereto without departing from the spirit and scope of the invention as defined by the appended claims.

What is claimed is:

1. An information handling system comprising:
   a housing;
   a processor disposed in the housing and operable to execute instructions to process information;
   a memory disposed in the housing and interfaced with the processor, the memory operable to store the instructions and information; and
   a camera interfaced with the processor, the camera having a camera housing, a lens assembly disposed in the camera housing to direct light from exterior to the housing along a lens axis and at beam splitter located along the lens axis within the camera housing, the beam splitter reflecting light of a first spectrum off the lens axis and to a first image sensor located in the camera housing and passing light of a second spectrum through the beam splitter along the lens axis and to a second image sensor located in the camera housing, the first image sensor capturing a visual image of the first spectrum light, the second image sensor capturing a visual image of the second spectrum light.

2. The information handling system of claim 1 wherein:
   the beam splitter comprises a cold mirror that reflects visible light and passes infrared light;
   the first spectrum comprises visible light; and
   the second spectrum comprises infrared light.

3. The information handling system of claim 1 wherein:
   the beam splitter comprises a hot mirror that reflects infrared light and passes visible light;
   the first spectrum comprises infrared light; and
   the second spectrum comprises visible light.

4. The information handling system of claim 1 wherein:
   the first image sensor comprises a visible light sensor; and
   the second image sensor comprises an infrared light sensor.

5. The information handling system of claim 4 wherein the mirror reflects the visible light at an angle of incidence of substantially 45 degrees to the first image sensor aligned perpendicular to the second image sensor.

6. The information handling system of claim 4 wherein the mirror reflects the visible light an angle of incidence of less than 10 degrees to the first image sensor.

7. The information handling system of claim 4 further comprising:
   a non-transitory memory operable to store instructions that execute on a processing resource; and
   instructions stored in the non-transitory memory that when executed on the processing resource enhance images captured with the visible light sensor using images captured with the infrared sensor.

8. The information handling system of claim 4 further comprising:
   a shutter disposed at the camera housing exterior and operable to transition between a closed position that blocks light from passing through the lens and an open position allows light to pass through the lens.

9. The information handling system of claim 8 wherein:
   an infrared light source disposed at the camera housing exterior and operable to illuminate a predetermined infrared light;
   wherein the shutter closed position does not impede illumination of the infrared light source.

10. A method for capturing visual images, the method comprising:
    directing light into a camera housing through a single lens assembly having a lens axis;
    passing the light to a first image sensor located in the camera housing on the lens axis through a beam splitter disposed along the lens axis, the beam splitter passing a first light spectrum to the first image sensor and reflecting a second light spectrum along a reflection axis off axis from the lens axis, the first image sensor capturing a first image; and
    capturing an image of the light of the second light spectrum with a second image sensor located in the camera housing on the reflection axis.

11. The method of claim 10 wherein:
    the beam splitter comprises a cold mirror that reflects visible light and passes infrared light;
    the first spectrum comprises infrared light; and
    the second spectrum comprises visible light.

12. The method of claim 10 wherein:
    the beam splitter comprises a hot mirror that reflects infrared light and passes visible light;
    the first spectrum comprises visible light; and
    the second spectrum comprises infrared light.

13. The method of claim 10 further comprising:
    capturing a visible light image of a predetermined resolution at one of the first and second image sensors;
    capturing an infrared image of the predetermined resolution at the other one of the first and second image sensors; and
    adjusting the visible light image with boundaries of the infrared image.

14. The method of claim 10 further comprising:
    adjusting the angle of incidence of the beam splitter to adjust the reflection axis; and
    applying the image captured by the second image sensor to generate three dimensional effects at the image of the first image sensor.

15. The method of claim 10 further comprising:
    illuminating infrared light from an infrared light source of the camera; and
    capturing reflections of the illuminated infrared light with one of the first or second image sensor, the other of the first or second image sensor powered off.

16. The method of claim 15 further comprising:
    covering the lens assembly with a shutter closed position; and
    leaving the infrared light source exposed with the shutter closed position.

17. A camera comprising:
    a camera housing;
    a lens assembly disposed in the camera housing to direct light from exterior the camera housing along a lens axis interior the camera housing;
    a first image sensor disposed in the camera housing interior along the lens axis to capture images from light traveling along the lens axis;
    a beam splitter disposed in the camera housing interior between the lens assembly and the first image sensor along the lens axis, the beam splitter passing light of a first spectrum to the first image sensor and reflecting light of a second spectrum from the lens axis to a reflection axis; and a second image sensor disposed in the camera housing interior along the reflection axis to capture images reflecting from the beam splitter.

18. The camera of claim 17 wherein:

the beam splitter comprises a cold mirror that reflects visible light and passes infrared light;

the first spectrum comprises infrared light; and the second spectrum comprises visible light.

19. The camera of claim 17 wherein:

the beam splitter comprises a hot mirror that reflects infrared light and passes visible light;

the first spectrum comprises visible light; and the second spectrum comprises infrared light.

20. The camera of claim 17 further comprising an infrared light source aligned to illuminate infrared light away from the camera along the lens axis, the infrared illumination in a spectrum matching one of the first or second light sensors.

* * * * *